United States Patent
Syed et al.

(10) Patent No.: US 12,225,138 B2
(45) Date of Patent: Feb. 11, 2025

(54) METHOD AND SYSTEM FOR DISTRIBUTED DIGITAL SIGNATURE COMPUTATION

(71) Applicant: Tata Consultancy Services Limited, Mumbai (IN)

(72) Inventors: Habeeb Basha Syed, Hyderabad (IN); Arinjita Paul, Thane (IN); Meena Singh Dilip Thakur, Bangalore (IN); Rajan Mindigal Alasingara Bhattachar, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 198 days.

(21) Appl. No.: 18/052,767

(22) Filed: Nov. 4, 2022

(65) Prior Publication Data
US 2023/0299977 A1  Sep. 21, 2023

(30) Foreign Application Priority Data
Mar. 15, 2022 (IN) .............................. 202221014001

(51) Int. Cl.
*H04L 9/32* (2006.01)
*H04L 9/06* (2006.01)
(Continued)

(52) U.S. Cl.
CPC .......... *H04L 9/3252* (2013.01); *H04L 9/0618* (2013.01); *H04L 9/0869* (2013.01); *H04L 9/3066* (2013.01); *H04L 9/3218* (2013.01)

(58) Field of Classification Search
CPC ... H04L 9/3252; H04L 9/0618; H04L 9/0869; H04L 9/3066; H04L 9/3218; H04L 9/3073; H04L 9/32; G06F 21/64
See application file for complete search history.

(56) References Cited

U.S. PATENT DOCUMENTS

| | | | |
|---|---|---|---|
| 10,530,585 B2 | 1/2020 | Lindell | |
| 2006/0117181 A1* | 6/2006 | Brickell | H04L 9/3271 713/176 |
| 2022/0255735 A1* | 8/2022 | Masny | H04L 9/30 |

FOREIGN PATENT DOCUMENTS

WO  WO2020177977 A1  9/2020

OTHER PUBLICATIONS

Gennaro, Rosario et al, "Fast Multiparty Threshold ECDSA with Fast Trustless Setup", ACM SIGSAC Conference, Date: Oct. 2018, Publisher: ACM, https://eprint.iacr.org/2019/114.pdf.

* cited by examiner

*Primary Examiner* — Quazi Farooqui
(74) *Attorney, Agent, or Firm* — Finnegan, Henderson, Farabow, Garrett & Dunner, LLP

(57) ABSTRACT

This disclosure relates to field of cryptography and digital signatures. The constant theft of cryptocurrencies is due to compromise of the secret signing key inherently stored in a single location. Also, one of challenges in the existing ECDSA signature is single point failure, wherein the signing key (private key) is prone to theft. The disclosed technique overcomes the challenging in the existing techniques by party distributed signature that ensures the safety of the private key. The disclosed techniques slits the key in two parts and saves at two different locations/machines. Further based on a ECDSA based technique, the digital signature is obtained securely using several steps that includes generation of first two parts of digital signature at one party, generation of the second two parts of digital signature at second party, finally decrypting a complete digital signature at the first party.

14 Claims, 8 Drawing Sheets

(51) Int. Cl.
*H04L 9/08* (2006.01)
*H04L 9/30* (2006.01)

METHOD AND SYSTEM FOR DISTRIBUTED DIGITAL SIGNATURE COMPUTATION

PRIORITY CLAIM

This U.S. patent application claims priority under 35 U.S.C. § 119 to: India Application No. 202221014001, filed on Mar. 15, 2022. The entire contents of the aforementioned application are incorporated herein by reference.

TECHNICAL FIELD

The disclosure herein generally relates to the field of cryptography and digital signatures, and, more particularly, to a method and a system for distributed digital signature computation.

BACKGROUND

With the advancement of digital technology, blockchain based solutions have become one of the most promising due to their distributed and decentralized ledgers. The blockchain technology empowers participants to confirm transactions such as fund transfers, trading without a need for a central clearing authority. The fund transfer in blockchain utilizes a virtual currency called crypto currency. The crypto currency uses cryptography for security, making it difficult to counterfeit while allowing for nearly anonymous financial transactions between two parties. However, a primary drawback of crypto currency in blockchains is theft of private key and the loss of the private key due to a software or hardware failure.

The constant theft of cryptocurrencies is due to compromise of the secret signing key inherently stored in a single location. To overcome the challenge of the secret signing key in a single location, the existing prior arts utilize hardware Security Modules (HSMs). However, the HSMs is expensive and may also be prone to side-channel attacks. Further, few other prior arts use a distributed Elliptic Curve Digital Signature Algorithm (ECDSA) signature protocol to overcome the disadvantages of ECDSA, wherein ECDSA enables generation of ECDSA signatures using private key shares stored in different locations.

One of challenges in the existing ECDSA signature is single point failure, wherein the signing key (private key) is prone to theft. Hence there is a need to ensure the safety of the private key.

SUMMARY

Embodiments of the present disclosure present technological improvements as solutions to one or more of the above-mentioned technical problems recognized by the inventors in conventional systems. For example, in one embodiment, a method for distributed digital signature computation is provided.

The system includes a memory storing instructions, one or more communication interfaces, and one or more hardware processors coupled to the memory via the one or more communication interfaces, wherein the one or more hardware processors are configured by the instructions to share, via one or more hardware processors, a plurality of input parameters and a message digest (M) with the first party and the second party, wherein the plurality of input parameters comprises an elliptic curve (E) defined as an elliptic curve equation over a finite field, a group base point in the elliptic curve (G), a fixed prime number indicating an order of points in the elliptic curve (q), a Paillier Encryption parameters including a Paillier modulus (N), a Paillier private key (A (N)), a Paillier public key (g), a first random number (a), a second random number (b), a third random number (k1) and a fourth random number (k2). The system is further configured to generate a public key, via one or more hardware processors, by the first party and the second party based on a public key generation technique, wherein the public key is generated by the first party and the second party using the plurality of input parameters, the first random number and the second random number. The system is further configured to generate a session key, via one or more hardware processors, by the first party and the second party based on a session key generation technique, wherein the session key is generated by the first party and the second party using the plurality of input parameters, the third random number (k1) and the fourth random number (k2). The system is further configured to generate a digital signature (S) by the first party and the second party, via one or more hardware processors, based on a digital signature generation technique, wherein the digital signature generation technique comprises: compute a first part of the digital signature (X1) and a second part of the digital signature (X2) at the first party, wherein the first part of the digital signature and the second part of the digital signature are computed based on the first random number, the third random number, the session key (r), and the message digest (M); compute a first ciphertext (C1), a first zero-knowledge proof (ZKP_C1) of the first ciphertext, a second ciphertext (C2), and a second zero-knowledge proof (ZKP_C2) of the second ciphertext, at the first party, wherein the first ciphertext is generated based on a Paillier Encryption technique using the first part of the digital signature (X1) and the Paillier public key and the second ciphertext is generated based on the Paillier Encryption technique using the second part of the digital signature (X2) and the Paillier public key; share the first ciphertext (C1), the first zero-knowledge proof (ZKP_C1), the second ciphertext (C2) and the second zero-knowledge proof (ZKP_C1) with the second party for a zero-knowledge proof verification; generate a third part of the digital signature (X3) and a fourth part of the digital signature (X4) upon successful validation of (a) the first zero-knowledge proof (ZKP_C1), and (b) the second zero-knowledge proof (ZKP_C1), wherein the third part of the digital signature and the fourth part of the digital signature are generated using the second random number, the fourth random number, the session key (r), the message digest (M) and the private key share of the second party (b); compute a third ciphertext (C3) of the third signature and a fourth ciphertext (C4) of the fourth signature at the second party, wherein the third ciphertext and the fourth ciphertext (C4) are generated using the Paillier Encryption technique; generate an encrypted form of a full signature (Z) at the second party and sharing the encrypted form of the full signature (Z) with the first party, wherein the encrypted form of the full signature (Z) is generated by a summation of the third ciphertext (C3) and the fourth ciphertext (C4) using the Paillier encryption parameter; and obtain the digital signature (S) at the first party, wherein the digital signature is obtained by decrypting the encrypted form of full signature using the Paillier private key based on the Paillier Encryption technique and a ECDSA signature verification technique.

In another aspect, a method for distributed digital signature computation is provided. The method includes sharing a plurality of input parameters and a message digest (M) with the first party and the second party, wherein the plurality of input parameters comprises an elliptic curve (E)

defined as an elliptic curve equation over a finite field, a group base point in the elliptic curve (G), a fixed prime number indicating an order of points in the elliptic curve (q), a Paillier Encryption parameters including a Paillier modulus (N), a Paillier private key ($\lambda(N)$), a Paillier public key (g), a first random number (a), a second random number (b), a third random number (k1) and a fourth random number (k2). The method further includes generating a public key by the first party and the second party based on a public key generation technique, wherein the public key is generated by the first party and the second party using the plurality of input parameters, the first random number (a) and the second random number (b). The method further includes generating a session key by the first party and the second party based on a session key generation technique, wherein the session key is generated by the first party and the second party using the plurality of input parameters, the third random number (k1) and the fourth random number (k2). The method further includes generating a digital signature (S) by the first party and the second party based on a digital signature generation technique, wherein the digital signature generation technique comprises: computing a first part of the digital signature (X1) and a second part of the digital signature (X2) at the first party, wherein the first part of the digital signature and the second part of the digital signature are computed based on the first random number, the third random number, the session key (r), and the message digest (M), computing a first ciphertext (C1), a first zero-knowledge proof (ZKP_C1) of the first ciphertext, a second ciphertext (C2), and a second zero-knowledge proof (ZKP_C2) of the second ciphertext, at the first party, wherein the first ciphertext is computed based on a Paillier Encryption technique using the first part of the digital signature (X1) and the Paillier public key and the second ciphertext is computed based on the Paillier Encryption technique using the second part of the digital signature (X2) and the Paillier public key, sharing the first ciphertext (C1), the first zero-knowledge proof (ZKP_C1), the second ciphertext (C2) and the second zero-knowledge proof (ZKP_C1) with the second party for a zero-knowledge proof verification, generating a third part of the digital signature (X3) and a fourth part of the digital signature (X4) upon successful validation of (a) the first zero-knowledge proof (ZKP_C1), and (b) the second zero-knowledge proof (ZKP_C1), wherein the third part of the digital signature and the fourth part of the digital signature are generated using the second random number, the fourth random number, the session key (r), the message digest (M) and the private key share of the second party (b), computing a third ciphertext (C3) of the third signature and a fourth ciphertext (C4) of the fourth signature at the second party, wherein the third ciphertext and the fourth ciphertext (C4) are generated using the Paillier Encryption technique, generating an encrypted form of a full signature (Z) at the second party and sharing the encrypted form of the full signature (Z) with the first party, wherein the encrypted form of the full signature (Z) is generated by a summation of the third ciphertext (C3) and the fourth ciphertext (C4) using the Paillier encryption parameter and obtaining the digital signature (S) at the first party, wherein the digital signature is obtained by decrypting the encrypted form of full signature using the Paillier private key based on the Paillier Encryption technique and a ECDSA signature verification technique.

In yet another aspect, a non-transitory computer readable medium for distributed digital signature computation is provided. The program includes sharing a plurality of input parameters and a message digest (M) with the first party and the second party, wherein the plurality of input parameters comprises an elliptic curve (E) defined as an elliptic curve equation over a finite field, a group base point in the elliptic curve (G), a fixed prime number indicating an order of points in the elliptic curve (q), a Paillier Encryption parameters including a Paillier modulus (N), a Paillier private key ($\lambda(N)$), a Paillier public key (g), a first random number (a), a second random number (b), a third random number (k1) and a fourth random number (k2). The program further includes generating a public key, by the first party and the second party based on a public key generation technique, wherein the public key is generated by the first party and the second party using the plurality of input parameters, the first random number (a) and the second random number (b). The program further includes generating a session key by the first party and the second party based on a session key generation technique, wherein the session key is generated by the first party and the second party using the plurality of input parameters, the third random number (k1) and the fourth random number (k2). The program further includes generating a digital signature (S) by the first party and the second party based on a digital signature generation technique, wherein the digital signature generation technique comprises: computing a first part of the digital signature (X1) and a second part of the digital signature (X2) at the first party, wherein the first part of the digital signature and the second part of the digital signature are computed based on the first random number, the third random number, the session key (r), and the message digest (M), computing a first ciphertext (C1), a first zero-knowledge proof (ZKP_C1) of the first ciphertext, a second ciphertext (C2), and a second zero-knowledge proof (ZKP_C2) of the second ciphertext, at the first party, wherein the first ciphertext is computed based on a Paillier Encryption technique using the first part of the digital signature (X1) and the Paillier public key and the second ciphertext is computed based on the Paillier Encryption technique using the second part of the digital signature (X2) and the Paillier public key, sharing the first ciphertext (C1), the first zero-knowledge proof (ZKP_C1), the second ciphertext (C2) and the second zero-knowledge proof (ZKP_C1) with the second party for a zero-knowledge proof verification, generating a third part of the digital signature (X3) and a fourth part of the digital signature (X4) upon successful validation of (a) the first zero-knowledge proof (ZKP_C1), and (b) the second zero-knowledge proof (ZKP_C1), wherein the third part of the digital signature and the fourth part of the digital signature are generated using the second random number, the fourth random number, the session key (r), the message digest (M) and the private key share of the second party (b), computing a third ciphertext (C3) of the third signature and a fourth ciphertext (C4) of the fourth signature at the second party, wherein the third ciphertext and the fourth ciphertext (C4) are generated using the Paillier Encryption technique, generating an encrypted form of a full signature (Z) at the second party and sharing the encrypted form of the full signature (Z) with the first party, wherein the encrypted form of the full signature (Z) is generated by a summation of the third ciphertext (C3) and the fourth ciphertext (C4) using the Paillier encryption parameter and obtaining the digital signature (S) at the first party, wherein the digital signature is obtained by decrypting the encrypted form of full signature using the Paillier private key based on the Paillier Encryption technique and a ECDSA signature verification technique.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
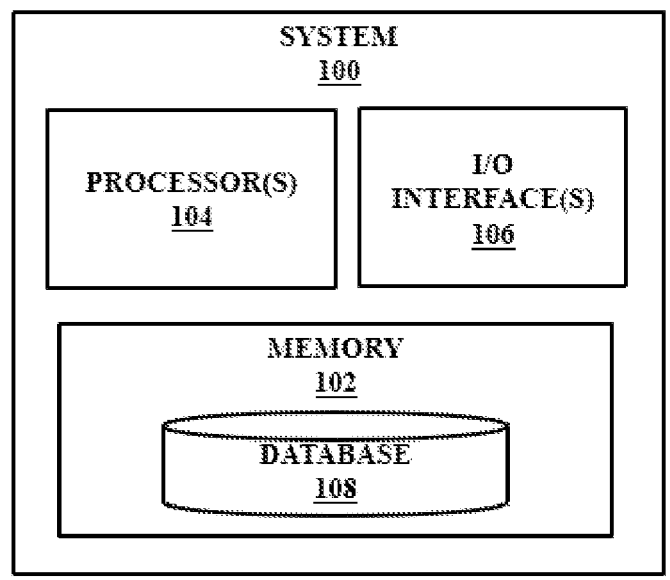
FIG. 1 illustrates an exemplary system for distributed digital signature computation according to some embodiments of the present disclosure, FIG. 2A, FIG. 2B, FIG. 2C
Figure 2A:
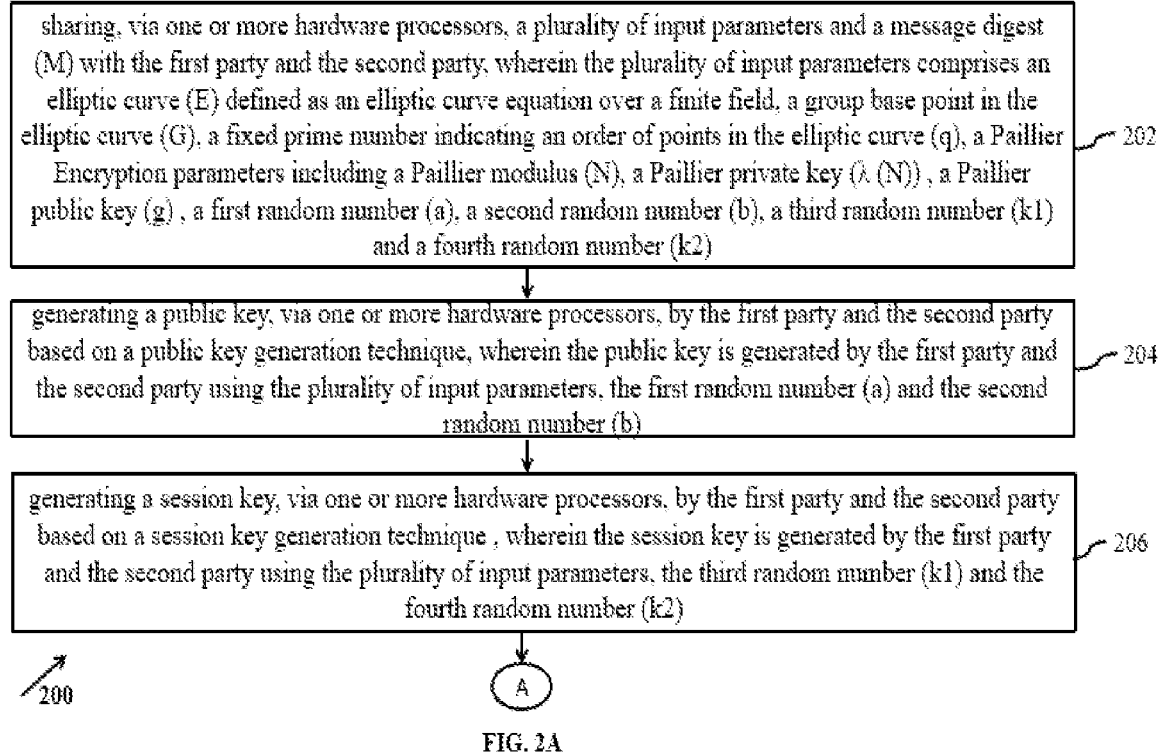
FIG. 2D is a flow diagram illustrating a method (200) for distributed digital signature computation in accordance with some embodiments of the present disclosure.
Figure 2B:
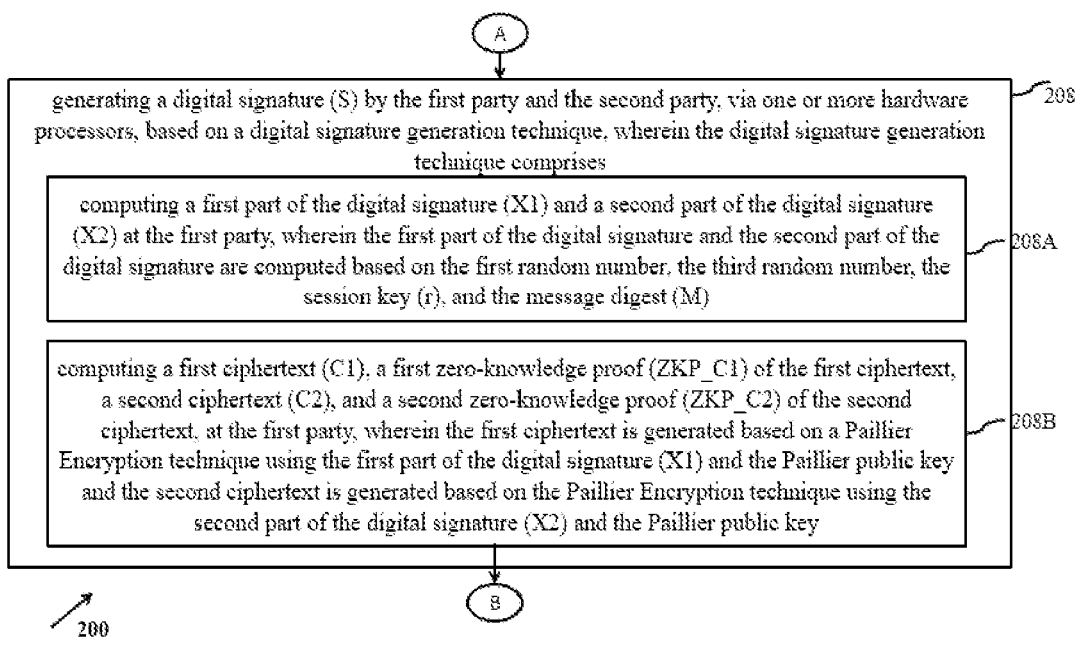
Figure 2C:
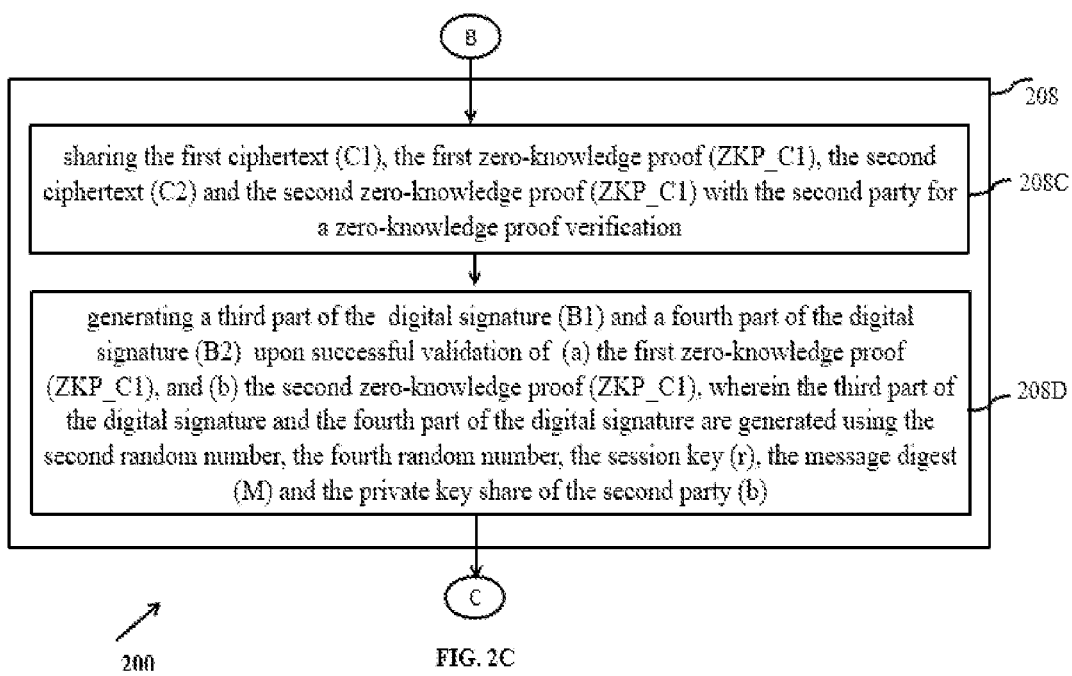
Figure 2D:
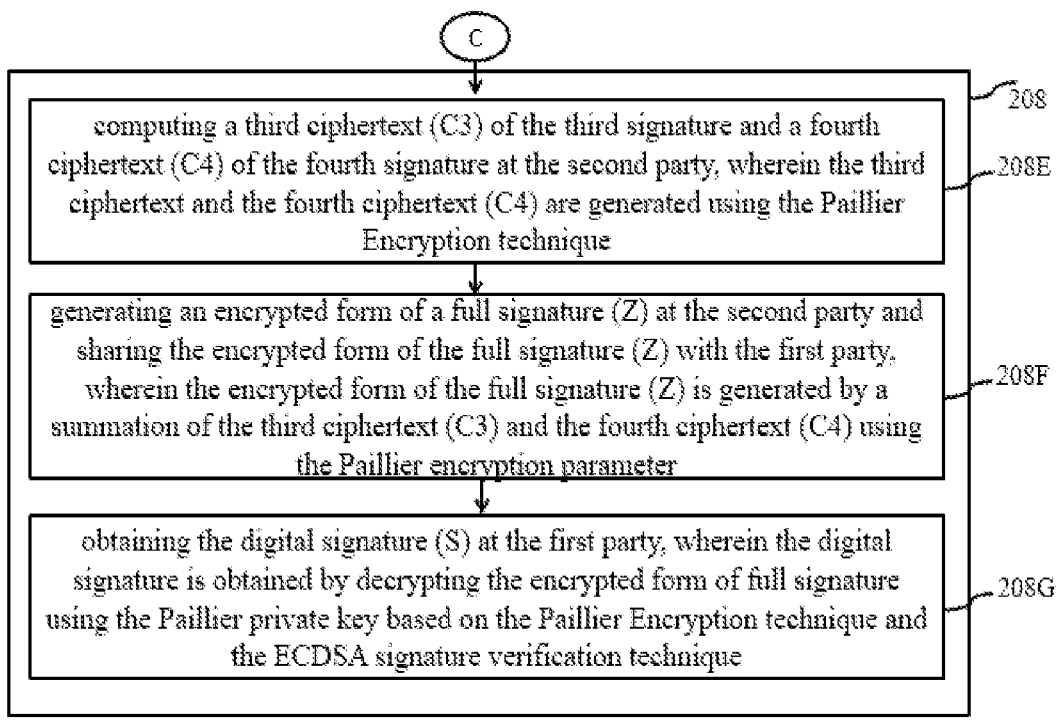

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The disclosure generates a digital signature based on ECDSA. In the disclosure a private key is split as two random shares between two parties and the two parties run a secure multiparty protocol to generate the digital signature, wherein two parties refer to one of two computing devices such as two PCs, two servers, two mobile devices, etc., or a combination of above devices, for example one PC and one mobile.

An existing prior art—US20180359097A1 also belongs to the same field of invention of two party ECDSA method. A main feature of the patent includes a method wherein the first party encrypts its key share and exchange it with the second party. Further, the two parties use two party protocol to compute signature. A challenge in the cited patent is that the key generation involves complex and interactive protocols to prove the correctness of the keys shared, hence the key generation takes 2.5 seconds in contrast to the disclosed key generation that takes 5 milliseconds for the same as illustrated in the experiment section.

Another existing prior art—"Secure Two-party Threshold ECDSA from ECDSA Assumptions" by Deoerner et. al. also belongs to the same field of invention of two party ECDSA method. The paper proposes a novel multiplication method using Oblivious Transfer techniques, which requires multiple rounds of communication during key generation and signature computation. However, the disclosed patent uses simple additive key generation method using linear secret sharing scheme, thus making the disclosed technique more efficient as illustrated in the experiment section.

The disclosed technique has several advantages compared to the mentioned/cited prior art items which includes no requirement of any participation in any kind of key exchange or generation method if any two parties want to combine [or aggregate] their ECDSA signature. In case of any ECDSA signature exchange the parties can simply run the disclosed digital signature computation technique, which results in a single [known as aggregated] signature, wherein the digital signature (single) guarantees that both parties have participated in the signature computation and requires a public key that is aggregation of the two individual public keys. On the other hand if the two parties use the methods proposed in the two cited prior arts, then they first have to run in a joint key generation method, which is not required in the disclosed technique.

Referring now to the drawings, and more particularly to FIG. 1 through FIG. 4B, where similar reference characters denote corresponding features consistently throughout the figures, there are shown preferred embodiments and these embodiments are described in the context of the following exemplary system and/or method.

FIG. 1 is an exemplary block diagram of a system 100 for distributed digital signature computation in accordance with some embodiments of the present disclosure. The system 100 enables communication between the two parties that require to generate the digital signature.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of the system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 is configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, a network cloud and the like.

The I/O interface(s) 106 can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Further, the memory 102 may include a database 108 configured to include information regarding extraction of tasks, labelling of words, performing pre-processing of received documents. The memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106.

Figure 3:
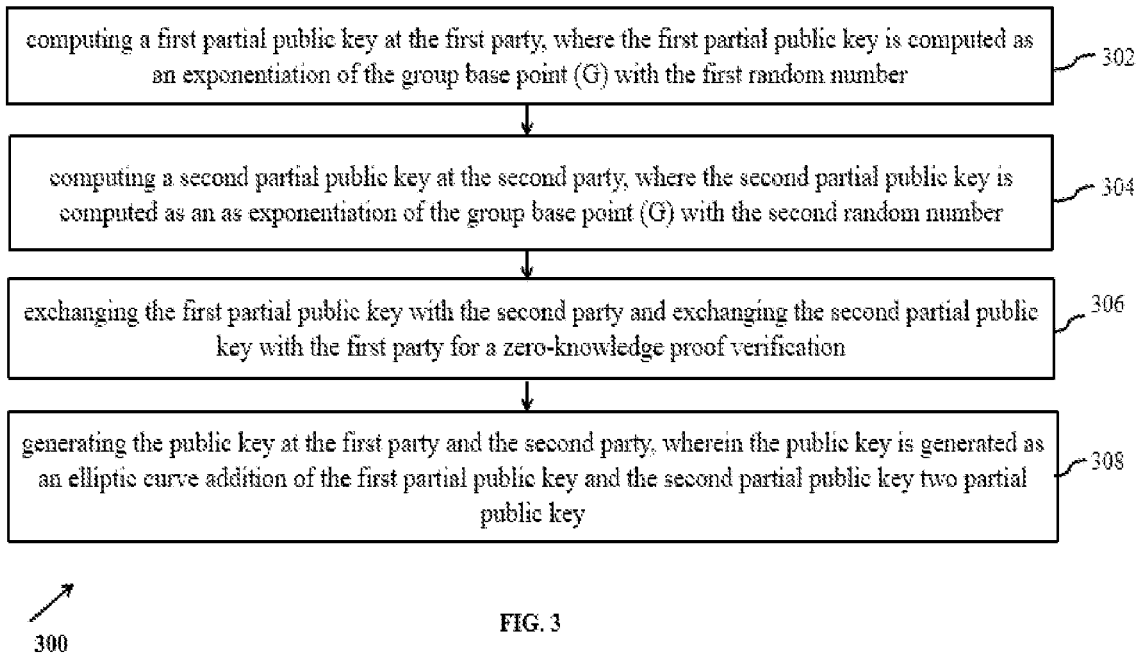
FIG. 3 is a flow diagram illustrating a method (300) for public key generation technique during distributed digital signature computation in accordance with some embodiments of the present disclosure, and FIG. 4A

Functions of the components of system 100 are explained in conjunction with functional overview of the system 100 in FIG. 2 and flow diagram of FIG. 3 for distributed digital signature computation.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

The various modules of the system 100 are configured for distributed digital signature computation are implemented as at least one of a logically self-contained part of a software program, a self-contained hardware component, and/or, a self-contained hardware component with a logically self-contained part of a software program embedded into each of the hardware component that when executed perform the above method described herein.

Functions of the components of the system 100 are explained in conjunction with flow diagram of FIG. 2. The FIG. 2 with reference to FIG. 1, is an exemplary flow diagram illustrating a method 200 for distributed digital signature computation using the system 100 of FIG. 1 according to an embodiment of the present disclosure.

The steps of the method 200 of the present disclosure will now be explained with reference to the components of the system (100) for distributed digital signature computation as depicted the flow diagrams as depicted in FIG. 3. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 202 of the method (200) a plurality of input parameters and a message digest (M) is shared with the first party and the second party, via one or more hardware processors 104.

The plurality of input parameters comprises an elliptic curve (E) defined as an elliptic curve equation over a finite field, a group base point in the elliptic curve (G), a fixed prime number indicating an order of points in the elliptic curve (q), a Paillier Encryption parameters including a Paillier modulus (N), a Paillier private key ($\lambda(N)$), a Paillier public key (g), a first random number (a), a second random number (b), a third random number (k1) and a fourth random number (k2).

In an embodiment, the first party and the second party refer to one of two computing devices such as two PCs, two servers, two mobile devices, etc., or a combination of above devices, for example one PC and one mobile.

The first random number (a) and the second random number (b) are shares of a secret key (sk). The first random number (a) and the second random number (b) are defined by the rule as shown below:

$$a+b=\text{sk}(\text{modulo } q) \quad (1)$$

The disclosed technique ensures secure generation of the digital signature by splitting the secret key and distributing one part each to the participating parties, thus increasing safety and making the technique more secure.

At step 204 of the method (200), a public key is generated by the first party and the second party based on a public key generation technique, via one or more hardware processors 104. The public key is generated by the first party and the second party using the plurality of input parameters, the first random number (a) and the second random number (b).

The two parties—the party A and the party B independently generate their key shares and then together obtain the public key in several steps as discussed below—using the public key generation technique.

In an embodiment, the method for public key generation technique is explained using flowchart of 300 as depicted in FIG. 3. The public key generation technique comprises the following steps.

At step 302 of the method (300), a first partial public key is computed at the first party. The first partial public key is computed as an exponentiation of the group base point (G) with the first random number (a).

In an embodiment, the first party generates the first random number (a) which is the first share of the private key. Further the first part of public key (G1) is obtained as exponentiation of base point with the first key share. To prove that the first share of the key and the first part of public key are valid the first party generates a zero-knowledge proof (ZKP), wherein the ZKP is a cryptographic construct used to prove integrity of a class of computations, wherein the class of computation refers to providing a correctness of discrete logarithm operation. If the ZKP is valid, the process of generation of the digital key is continued while if the ZKP is invalid, then the process of the generation of the digital key is aborted.

$$G_1 = a*G \quad (2)$$

At step 304 of the method (300), a second partial public key is computed at the second party. The second partial public key is computed as an as exponentiation of the group base point (G) with the second random number In an embodiment, the second party generates the second random number which is the second share of the private key. Further the second part of the public key is obtained as exponentiation of base point with the second random number. To prove that its (second) key share and the second part of public key are valid the second party generates the zero-knowledge proof (ZKP). If the ZKP is valid, the process of generation of the digital key is continued while if the ZKP is invalid, then the process of the generation of the digital key is aborted.

$$G_2 = b*G \quad (3)$$

At step 306 of the method (300), the first partial public key is exchanged with the second party and the second partial public key is exchanged with the first party for a zero-knowledge proof verification.

The first party verifies that the zero-knowledge proof (ZKP) received (from the second party) is valid, wherein in case of invalid ZKP, the generation of the digital signature is aborted. Similarly, the second party verifies that the zero-knowledge proof received (from the first party) is valid, wherein in case of invalid ZKP, the generation of the digital signature is aborted. If none of the parties call abort, the public key is generated simultaneously at the first party and the second party.

At step 308 of the method (300), the public key is generated at the first party and the second party. The public key is generated as an elliptic curve point addition (denoted by ⊗) of the first partial public key and the second partial public key two partial public key.

In an embodiment, the generation of the public key at the first party is expressed as shown below:

$$G_A = G_1 \otimes G_2 \tag{4}$$

In an embodiment, the generation of the public key at the second party is expressed as shown below:

$$G_B = G_1 \otimes G_2 \tag{5}$$

The public keys generated at the first party and the second party are exchanged with each other. Each of the first party and the second party compares the public key it has received (from the other party) with the public key it has computed, if the public keys are same, the generation of the digital signature is continued, while the generation of the digital signature is aborted for unequal public key i.e. when the received and generated public keys match.

Referring to FIG. 2, at step 206 of the method (200), a session key is generated by the first party and the second party based on a session key generation technique, via one or more hardware processors 104. The session key is generated by the first party and the second party using the plurality of input parameters, the third random number ($k_1$) and the fourth random number ($k_2$).

Figure 4A:
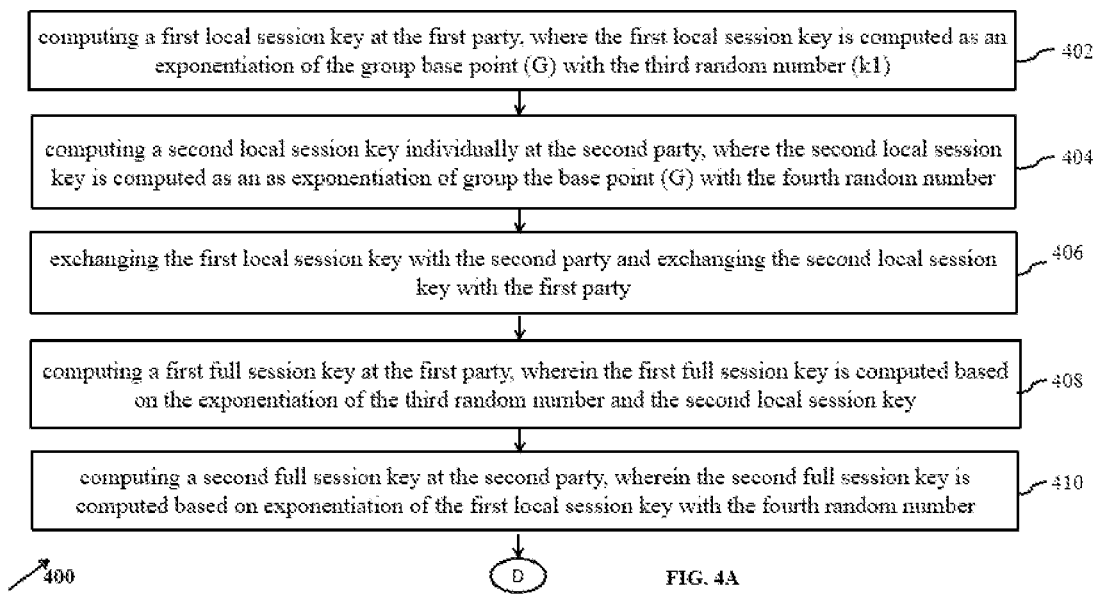
FIG. 4B is a flow diagram illustrating a method (400) for session key generation technique during for distributed digital signature computation in accordance with some embodiments of the present disclosure.
Figure 4B:
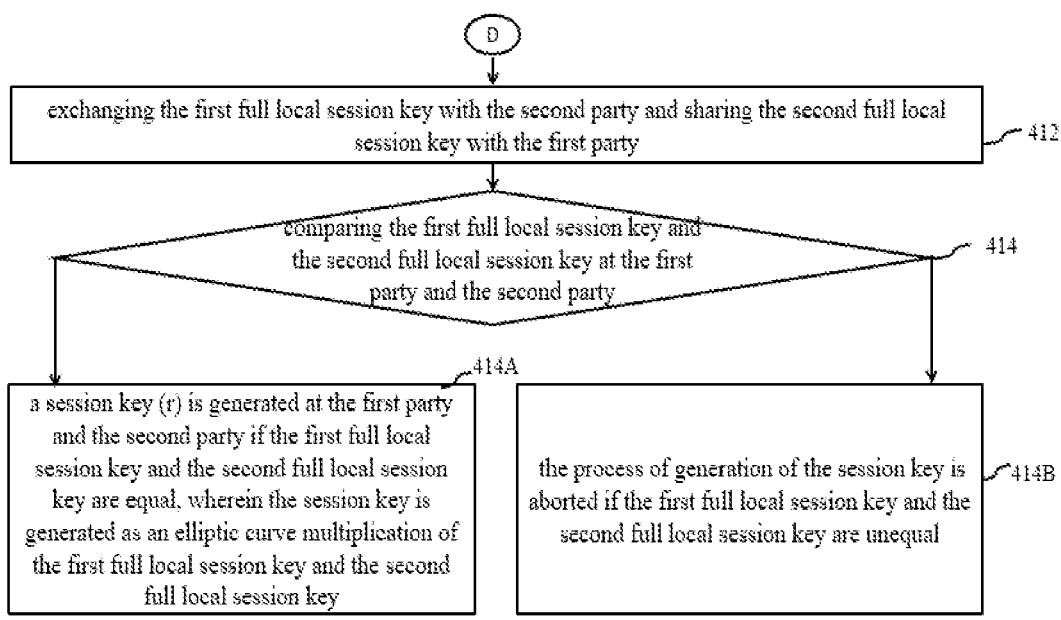

In an embodiment, the method for session key generation technique is explained using flowchart of 300 as depicted in FIG. 4. The session key generation technique comprises the following steps.

At step 402 of the method (400), a first local session key is computed at the first party. The first local session key is computed as an exponentiation of the group base point (G) with the third random number ($k_1$).

In an embodiment, the first party generates the third random number ($k_1$) and computes the first local session key ($R_1$):

$$R_1 = k_1 * G \tag{6}$$

At step 404 of the method (400), a second local session key is computed at the second party. The second local session key is computed as an as exponentiation of group the base point (G) with the fourth random number ($k_2$).

In an embodiment, the second party generates the fourth random number ($k_2$) and computes the second local session key:

$$R_2 = k2 * G \tag{7}$$

At step 406 of the method (400), the first local session key is exchanged with the second party and the second local session key is exchanged with the first party.

At step 408 of the method (400), a first full session key is computed at the first party. The first full session key is computed based on the exponentiation of the third random number and the second local session key.

In an embodiment, first full session key is computed at the first party as shown below:

$$R_A = k_1 * R_2 \tag{8}$$

wherein $R_A$ is a point on the Elliptic Curve and is of the form of a tuple as shown below:

$$R_A = (x_A, y_A)$$

At step 410 of the method (400), a second full session key is computed at the second party. The second full session key is computed based on exponentiation of the first local session key with the fourth random number.

In an embodiment, second full session key is computed at the second party as shown below:

$$R_B = k_2 * R_1 \tag{9}$$

wherein $R_B$ is a point on the Elliptic Curve and is of the form of a tuple as shown below:

$$R_B = (x_B, y_B)$$

At step 412 of the method (400), the first full local session key is exchanged with the second party and the second full local session key is exchanged with the first party.

At step 414 of the method (400), the first full local session key is compared with the second full local session key by both the first party and the second party. Based on the comparison, either step 414A or 414B is performed.

At step 414A of the method (400), if the first full local session key and the second full local session key are equal (that is if $x_A = x_B$ and $y_A = y_B$) then a session key (r) is generated at both the first party and the second party. The session key is generated as an elliptic curve point multiplication of the first full local session key and the second full local session key.

$$r = x_A \text{ or } r = x_B \tag{10}$$

At step 414B of the method (400), if the first full local session key and the second full local session key are unequal, then the process of generation of the session key is aborted.

At step 208 of the method (200), a digital signature (S) is generated by the first party and the second party, via one or more hardware processors 104. The digital signature generation technique includes computation of a first part of the digital signature (X1), a second part of the digital signature (X2), a third part of the digital signature (X3), and a fourth part of the digital signature (X4), and comprises the following sub-steps.

At step 208A, the first part of the digital signature (X1) and the second part of the digital signature (X2) are computed at the first party. The first part of the digital signature and the second part of the digital signature are computed based on the first random number, the third random number, the session key (r), and the message digest (M).

In an embodiment, the first part of the digital signature is computed based on the first random number, the third random number, the session key (r), and the message digest (M) as shown below:

$$X1 = (1/k1) * (M + a * r)(\text{modulo } q) \tag{11}$$

The first part of the digital signature (X1) and the second part of the digital signature (X2) are computed by the first party, wherein the first part of the digital signature (X1) is the first and main part of the digital signature on the message M with private key share of the first party.

In an embodiment, the second part of the digital signature is computed based on the first random number, the third random number, the session Key®, and the message digest (M) as shown below:

$$X2 = (1/k1) * (-a * r)(\text{modulo } q) \tag{12}$$

The second part of the digital signature (X2) is utilized to remove occurrence of any extra terms in the final signature that result due to distributed nature of the computation.

At step 208B, a first ciphertext (C1), a first zero-knowledge proof (ZKP_C1) of the first ciphertext, a second ciphertext (C2), and a second zero-knowledge proof (ZKP_C2) of the second ciphertext are computed at the first party.

The first party provides ZKP_C1 and ZKP_C2 to prove to the second party that the ciphertexts C1 and C2 are the valid encryptions of X1 and X2 respectively under the Paillier public key of first party and that the inequality 1≤X1, X2≤N holds.

The first ciphertext (C1) is computed based on a Paillier Encryption technique using the first part of the digital signature (X1) and the Paillier public key (of the first party). A First zero knowledge proof (denoted by ZKP_C1) is utilized to prove validity of ciphertext C1, represented as shown below:

$$C1 = \text{Paillier-Encryption}(X1, \text{PubKey}_A) \quad (13)$$

wherein,
$\text{PubKey}_A$ denotes the Paillier encryption public key of party A (the first party)

The second ciphertext is computed based on the Paillier Encryption technique using the second part of the digital signature (X2) and the Paillier public key (of the first party). A second zero knowledge proof (denoted by ZKP_C2) is utilized to prove validity of ciphertext C2 represented as shown below:

$$C2 = \text{Paillier-Encryption}(X2, \text{PubKey}_A) \quad (14)$$

At step 208C, the first ciphertext (C1), the first zero-knowledge proof (ZKP_C1), the second ciphertext (C2) and the second zero-knowledge proof (ZKP_C2) is shared with the second party for a zero-knowledge proof verification.

In an embodiment, the ZKP_C1 and the ZKP_C2 is shared with the second party for a zero-knowledge proof verification, wherein second party verifies that the zero-knowledge proof (ZKP) received (from the first party) is valid or invalid. In case of invalid ZKP, the generation of the digital signature is aborted. Further for a valid ZKP, the process of generation of the digital signature is continued.

At step 208D, a third part of the digital signature (X3) and a fourth part of the digital signature (X4) is generated at the second party. The third part of the digital signature (B1) and a fourth part is generated upon successful validation of:
(a) the first zero-knowledge proof (ZKP_C1), and
(b) the second zero-knowledge proof (ZKP_C2).

The third part of the digital signature and the fourth part of the digital signature are generated using the second random number, the fourth random number, the session key (r), the message digest (M) and the private key share of the second party (b).

In an embodiment, third part of the digital signature is generated using the second random number, the fourth random number, the session key (r), the message digest (M) and the private key share of the second party (b).

$$X3 = (1/k2)*(M + r*b)(\text{modulo } q) \quad (15)$$

The third part of the digital signature (X3) and the fourth part of the digital signature (X4) is computed by the second party, wherein the third part of the digital signature (X3) is the first and main part of the digital signature on the message M with private key share of the second party.

In an embodiment, fourth part of the digital signature is generated using the second random number, the fourth random number, the session key (r), the message digest (M) and the private key share of the second party (b).

$$X4 = (1/k2)*(b*r*r)(\text{modulo } q) \quad (16)$$

The fourth part of the digital signature (X4) is utilized to remove any extra terms in the final signature that may result due to distributed nature of the computation.

At step 208E, a third ciphertext (C3) of the third signature and a fourth ciphertext (C4) of the fourth signature is computed at the second party. The third ciphertext and the fourth ciphertext (C4) are generated using the Paillier Encryption technique.

The third ciphertext (C3) and the fourth ciphertext (C4) are numerically computed as $C3 = C1^{X3}$ and $C4 = C2^{X4}$ also expressed as shown below:

$$C3 = C1^{X3}(\text{modulo } N^2) \quad (17)$$

$$C4 = C2^{X4}(\text{modulo } N^2) \quad (18)$$

At step 208F, an encrypted form of a full signature (Z) is generated at the second party. The encrypted form of the full signature (Z) is generated by a summation of the third ciphertext (C3) and the fourth ciphertext (C4) using the Paillier encryption parameter. The encrypted form of a full signature (Z) is shared by the second party with the first party.

In an embodiment, after computing the numerical values of third and fourth parts of the digital signature, the second party combines all the four parts of the signature into single value as shown below:

$$Z = C1^{X3} + C2^{X4}(\text{modulo } N^2) \quad (19)$$

where N is a Paillier encryption parameter.

Since C1 and C2 are ciphertexts in the Paillier Encryption and since Paillier cryptosystem is partially homomorphic the value of Z obtained above is in encrypted format where the encryption key is the same as the one used by the first party. The full signature is shared with first party from the second party.

At step 208G, the digital signature (S) is obtained at the first party. The digital signature is obtained by decrypting the encrypted form of full signature using the Paillier private key (of the first party) based on the Paillier Encryption technique.

$$S = (1/M)*(Y)(\text{modulo } q) \quad (20)$$

wherein
Y is decrypted form of the full signature (Z)

The full signature is shared with first party, wherein the first party decrypts value of Z using private key of Paillier Cryptosystem, wherein the decrypted value is denoted by Y.

Here the value of S has a property that either S or N−S (modulo q) gives a valid signature. This property occurs due to distributed nature of the computation. In order to decide which of S or (N−S) (modulo q) gives a valid signature the first party runs ECDSA signature verification process on (r,S). If the verification is positive then the first party returns (r,S) as valid signature on M and ends [signature computation] method. Otherwise, the first party runs the ECDSA verification on (r, (N−S) modulo q). If this verification is positive then the first party outputs (r, N−S) as signature on M and ends [signature computation] method. If not first party outputs the message "Signature generation failed" and aborts the method.

The disclosed technique can be extended to a (2,n) threshold scheme. The signature computation method remains same as described in the above sections. However, the key generation method is tweaked to include a (2,n) as follows: The n parties agree on using some verifiable linear secret sharing scheme (In an example scenario: Feldman's Verifiable Secret Sharing Scheme). Using such a (pre decided) scheme each party distributes its key share among the remaining (n−1) parties in such a way that any 2 (of the n−1) parties can reconstruct the key share.

Experiments

An experiment has been simulated based on the disclosed technique and the performance time taken for key generation and signature generation is measured. The experimental setup includes two parties—Party1 and Party2 on two different endpoints. The Party1 and Party2 follow the method disclosed and jointly compute the shared secret key-public key and signature in the key generation and digital signature generation protocols respectively.

A standard Bitcoin curve—SECP256k1 was used for elliptic curve based operation and key size was kept as 1024 bits. For experimentation purposes, the entire code base is built in C using the open-ssl based ECC library for the elliptic curve operations and MPZ library for all the number theoretic operations. The ECDSA signature generated by the disclosed method is verified by any ECDSA verification algorithm. The experiments are run on machine with Intel I5 pro processor with 8 cores each with processor speed of 1.7 Ghz. The Random-Access Memory (RAM) of the machine is 16 GB and it is running on Ubuntu 18.0 operating system.

The disclosed ECDSA based digital signature technique has two components, key generation and signature computation. In case of multi-party protocols, the efficiency is indicated by the time required to run the protocols. The lesser the requirement the better is the protocol. The following table (Table 1) illustrates the comparison of timings taken by the disclosed technique and the two other known methods. The known methods used for comparison are as follows:

(a) Lindell, Y. Fast Secure Two-Party ECDSA Signing. J Cryptol 34, 44 (2021) or US20180359097A1—represented as—Method A in table.1
(b) J. Doerner, Y. Kondi, E. Lee and A. Shelat, "Secure Two-party Threshold ECDSA from ECDSA Assumptions," 2018 IEEE Symposium on Security and Privacy (SP), 2018, pp. 980-997, doi: 10.1109/SP.2018.00036—represented as Method B in table.1

TABLE 1

Comparison of timings

| | Key Generation | Signature Computation |
|---|---|---|
| | Time in milli seconds | |
| Method A | 2435 | 36.8 |
| Method B | 44.32 | 2.27 |
| Disclosed technique | 5.11 | 41.25 |

The disclosed technique has several advantages compared to the mentioned/cited prior art items which includes no requirement of any participation in any kind of key exchange or generation method if any two parties want to combine [or aggregate] their ECDSA signature. In case of any ECDSA signature exchange the parties can simply run the disclosed digital signature computation technique, which results in a single [known as aggregated] signature, wherein the digital signature (single) guarantees that both parties have participated in the signature computation and requires a public key that is aggregation of the two individual public keys. On the other hand if the two parties use the methods proposed in the two cited prior arts, then they first have to run in a joint key generation method, which is not required in the disclosed technique, hence resulting in faster and efficient generation of the digital signature.

Another advantage of the disclosed technique is the total computations required is much less compared to other cited prior arts. For example, Lindell's key generation method takes about 350 number of Paillier encryption/decryption operations while the disclosed technique takes only 4 Elliptic curve exponentiations. Similarly, the disclosed technique two party signature method requires only 16 Elliptic curve exponentiations, 5 Paillier encryption/decryption operations.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein provide a solution to secure digital key generation. The constant theft of cryptocurrencies is due to compromise of the secret signing key inherently stored in a single location. Also, one of challenges in the existing ECDSA signature is single point failure, wherein the signing key (private key) is prone to theft. The disclosed technique overcomes the challenging in the existing techniques by party distributed signature that ensures the safety of the private key. The disclosed techniques slits the key in two parts and saves at two different locations/machines. Further based on a ECDSA based technique, the digital signature is obtained securely using several steps that includes generation of first two parts of digital signature at one party, generation of the second two parts of digital signature at second party, finally decrypting a complete digital signature at the first party.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for Elliptic Curve Digital Signature Algorithm (ECDSA) based digital signature in a distributed fashion by a first party and a second party comprising:
   sharing, via one or more hardware processors, a plurality of input parameters and a message digest (M) with the first party and the second party, wherein the plurality of input parameters comprises an elliptic curve (E) defined as an elliptic curve equation over a finite field, a group base point in the elliptic curve (G), a fixed prime number indicating an order of points in the elliptic curve (q), a Paillier Encryption parameters including a Paillier modulus (N), a Paillier private key ($\lambda(N)$), a Paillier public key (g), a first random number (a), a second random number (b), a third random number (k1) and a fourth random number (k2);
   generating a public key, via one or more hardware processors, by the first party and the second party based on a public key generation technique, wherein the public key is generated by the first party and the second party using the plurality of input parameters, the first random number (a) and the second random number (b);
   generating a session key, via one or more hardware processors, by the first party and the second party based on a session key generation technique, wherein the session key is generated by the first party and the second party using the plurality of input parameters, the third random number (k1) and the fourth random number (k2); and
   generating a digital signature (S) by the first party and the second party, via one or more hardware processors, based on a digital signature generation technique, wherein the digital signature generation technique comprises:
   computing a first part of the digital signature (X1) and a second part of the digital signature (X2) at the first party, wherein the first part of the digital signature and the second part of the digital signature are computed based on the first random number, the third random number, the session key (r), and the message digest (M);
   computing a first ciphertext (C1), a first zero-knowledge proof (ZKP_C1) of the first ciphertext, a second ciphertext (C2), and a second zero-knowledge proof (ZKP_C2) of the second ciphertext, at the first party, wherein the first ciphertext is computed based on a Paillier Encryption technique using the first part of the digital signature (X1) and the Paillier public key and the second ciphertext is computed based on the Paillier Encryption technique using the second part of the digital signature (X2) and the Paillier public key;
   sharing the first ciphertext (C1), the first zero-knowledge proof (ZKP_C1), the second ciphertext (C2) and the second zero-knowledge proof (ZKP_C1) with the second party for a zero-knowledge proof verification;
   generating a third part of the digital signature (X3) and a fourth part of the digital signature (X4) upon successful validation of (a) the first zero-knowledge proof (ZKP_C1), and (b) the second zero-knowledge proof (ZKP_C1), wherein the third part of the digital signature and the fourth part of the digital signature are generated using the second random number, the fourth random number, the session key (r), the message digest (M) and the private key share of the second party (b);
   computing a third ciphertext (C3) of the third signature and a fourth ciphertext (C4) of the fourth signature at the second party, wherein the third ciphertext and the fourth ciphertext (C4) are generated using the Paillier Encryption technique;
   generating an encrypted form of a full signature (Z) at the second party and sharing the encrypted form of the full signature (Z) with the first party, wherein the encrypted form of the full signature (Z) is generated by a summation of the third ciphertext (C3) and the fourth ciphertext (C4) using the Paillier encryption parameter; and
   obtaining the digital signature (S) at the first party, wherein the digital signature is obtained by decrypting the encrypted form of full signature using the Paillier private key based on the Paillier Encryption technique and a ECDSA signature verification technique.

2. The method of claim 1, wherein the public key generation technique comprises:
- computing a first partial public key at the first party, where the first partial public key is computed as an exponentiation of the group base point (G) with the first random number;
- computing a second partial public key at the second party, where the second partial public key is computed as an as exponentiation of the group base point (G) with the second random number;
- exchanging the first partial public key with the second party and exchanging the second partial public key with the first party for a zero-knowledge proof verification; and
- generating the public key at the first party and the second party, wherein the public key is generated as an elliptic curve addition of the first partial public key and the second partial public key two partial public key.

3. The method of claim 1, wherein the session key generation technique comprises:
- computing a first local session key at the first party, where the first local session key is computed as an exponentiation of the group base point (G) with the third random number (k1);
- computing a second local session key at the second party, where the second local session key is computed as an as exponentiation of group the base point (G) with the fourth random number (k2);
- exchanging the first local session key with the second party and exchanging the second local session key with the first party;
- computing a first full session key at the first party, wherein the first full session key is computed based on the exponentiation of the third random number and the second local session key;
- computing a second full session key at the second party, wherein the second full session key is computed based on exponentiation of the first local session key with the fourth random number;
- exchanging the first full local session key with the second party and exchanging the second full local session key with the first party,
- comparing the first full local session key and the second full local session key at the first party and the second party, wherein
  - a session key (r) is generated at the first party and the second party if the first full local session key and the second full local session key are equal, wherein the session key is generated as an elliptic curve multiplication of the first full local session key and the second full local session key, or
  - the process of generation of the session key is aborted if the first full local session key and the second full local session key are unequal.

4. The method of claim 1, wherein if the zero-knowledge proof verification is invalid, then the process of the generation of the digital key is aborted.

5. The method of claim 1, wherein the computation of the first part of the digital signature (X1), the second part of the digital signature (X2) is expressed as:

$$X1=(1/k1)*(M+a*r)(\text{modulo } q)$$

$$X2=(1/k1)*(-a*r)(\text{modulo } q).$$

6. The method of claim 1, wherein the computation of the third part of the digital signature (B1) and the fourth part of the digital signature (B2) are expressed as:

$$X3=(1/k2)*(M+r*b)(\text{modulo } q)$$

$$X4=(1/k2)*(b*r*r)(\text{modulo } q).$$

7. The method of claim 1, wherein the generation of the digital signature (S) is expressed as:

$$S=(1/M)*(Y)(\text{modulo } q)$$

wherein
Y is decrypted form of the full signature (Z).

8. A system comprising:
- a memory storing instructions;
- one or more communication interfaces; and
- one or more hardware processors coupled to the memory via the one or more communication interfaces, wherein the one or more hardware processors are configured by the instructions to:
  - share, via one or more hardware processors, a plurality of input parameters and a message digest (M) with the first party and the second party, wherein the plurality of input parameters comprises an elliptic curve (E) defined as an elliptic curve equation over a finite field, a group base point in the elliptic curve (G), a fixed prime number indicating an order of points in the elliptic curve (q), a Paillier Encryption parameters including a Paillier modulus (N), a Paillier private key ($\lambda$(N)), a Paillier public key (g), a first random number (a), a second random number (b), a third random number (k1) and a fourth random number (k2);
  - generate a public key, via one or more hardware processors, by the first party and the second party based on a public key generation technique, wherein the public key is generated by the first party and the second party using the plurality of input parameters, the first random number and the second random number;
  - generate a session key, via one or more hardware processors, by the first party and the second party based on a session key generation technique, wherein the session key is generated by the first party and the second party using the plurality of input parameters, the third random number (k1) and the fourth random number (k2); and
  - generate a digital signature (S) by the first party and the second party, via one or more hardware processors, based on a digital signature generation technique, wherein the digital signature generation technique comprises:
    - compute a first part of the digital signature (X1) and a second part of the digital signature (X2) at the first party, wherein the first part of the digital signature and the second part of the digital signature are computed based on the first random number, the third random number, the session key (r), and the message digest (M);
    - compute a first ciphertext (C1), a first zero-knowledge proof (ZKP_C1) of the first ciphertext, a second ciphertext (C2), and a second zero-knowledge proof (ZKP_C2) of the second ciphertext, at the first party, wherein the first ciphertext is generated based on a Paillier Encryption technique using the first part of the digital signature (X1) and the Paillier public key and the second ciphertext is generated based on the Paillier Encryption technique using the second part of the digital signature (X2) and the Paillier public key;

share the first ciphertext (C1), the first zero-knowledge proof (ZKP_C1), the second ciphertext (C2) and the second zero-knowledge proof (ZKP_C1) with the second party for a zero-knowledge proof verification;

generate a third part of the digital signature (X3) and a fourth part of the digital signature (X4) upon successful validation of (a) the first zero-knowledge proof (ZKP_C1), and (b) the second zero-knowledge proof (ZKP_C1), wherein the third part of the digital signature and the fourth part of the digital signature are generated using the second random number, the fourth random number, the session key (r), the message digest (M) and the private key share of the second party (b);

compute a third ciphertext (C3) of the third signature and a fourth ciphertext (C4) of the fourth signature at the second party, wherein the third ciphertext and the fourth ciphertext (C4) are generated using the Paillier Encryption technique;

generate an encrypted form of a full signature (Z) at the second party and sharing the encrypted form of the full signature (Z) with the first party, wherein the encrypted form of the full signature (Z) is generated by a summation of the third ciphertext (C3) and the fourth ciphertext (C4) using the Paillier encryption parameter; and obtain the digital signature (S) at the first party, wherein the digital signature is obtained by decrypting the encrypted form of full signature using the Paillier private key based on the Paillier Encryption technique and a ECDSA signature verification technique.

9. The system of claim 8, wherein the one or more hardware processors are configured by the instructions to perform the public key generation technique comprising:

computing a first partial public key at the first party, where the first partial public key is computed as an exponentiation of the group base point (G) with the first random number;

computing a second partial public key at the second party, where the second partial public key is computed as an as exponentiation of the group base point (G) with the second random number;

exchanging the first partial public key with the second party and exchanging the second partial public key with the first party for a zero-knowledge proof verification; and generating the public key at the first party and the second party, wherein the public key is generated as an elliptic curve addition of the first partial public key and the second partial public key two partial public key.

10. The system of claim 8, wherein the one or more hardware processors are configured by the instructions to perform the session key generation technique comprising:

computing a first local session key at the first party, where the first local session key is computed as an exponentiation of the group base point (G) with the third random number;

computing a second local session key individually at the second party, where the second local session key is computed as an as exponentiation of group the base point (G) with the fourth random number;

exchanging the first local session key with the second party and exchanging the second local session key with the first party;

computing a first full session key at the first party, wherein the first full session key is computed based on the exponentiation of the third random number and the second local session key;

computing a second full session key at the second party, wherein the second full session key is computed based on exponentiation of the first local session key with the fourth random number;

exchanging the first full local session key with the second party and sharing the second full local session key with the first party; and comparing the first full local session key and the second full local session key at the first party and the second party, wherein a session key (r) is generated at the first party and the second party if the first full local session key and the second full local session key are equal, wherein the session key is generated as an elliptic curve multiplication of the first full local session key and the second full local session key, or the process of generation of the session key generation is aborted if the first full local session key and the second full local session key are unequal.

11. The system of claim 8, wherein the one or more hardware processors are configured by the instructions to perform the computation of the first part of the digital signature (X1), the second part of the digital signature (X2) is expressed as:

$$X1=(1/k1)*(M+a*r)(\text{modulo } q)$$

$$X2=(1/k1)*(-a*r)(\text{modulo } q).$$

12. The system of claim 8, wherein the one or more hardware processors are configured by the instructions to perform the computation of the third part of the digital signature (B1) and the fourth part of the digital signature (B2) is expressed as:

$$X3=(1/k2)*(M+r*b)(\text{modulo } q)$$

$$X4=(1/k2)*(b*r*r)(\text{modulo } q).$$

13. The system of claim 8, wherein the one or more hardware processors are configured by the instructions to perform the generation of the digital signature (S) is expressed as:

$$S=(1/M)*(Y)(\text{modulo } q)$$

wherein

Y is decrypted form of the full signature (Z).

14. One or more non-transitory machine-readable information storage mediums comprising one or more instructions which when executed, cause one or more hardware processors to:

share a plurality of input parameters and a message digest (M) with the first party and the second party, wherein the plurality of input parameters comprises an elliptic curve (E) defined as an elliptic curve equation over a finite field, a group base point in the elliptic curve (G), a fixed prime number indicating an order of points in the elliptic curve (q), a Paillier Encryption parameters including a Paillier modulus (N), a Paillier private key ($\lambda(N)$), a Paillier public key (g), a first random number (a), a second random number (b), a third random number (k1) and a fourth random number (k2);

generate a public key by the first party and the second party based on a public key generation technique, wherein the public key is generated by the first party and the second party using the plurality of input parameters, the first random number and the second random number;

generate a session key by the first party and the second party based on a session key generation technique, wherein the session key is generated by the first party and the second party using the plurality of input parameters, the third random number (k1) and the fourth random number (k2); and generate a digital signature (S) by the first party and the second party based on a digital signature generation technique, wherein the digital signature generation technique comprises:

compute a first part of the digital signature (X1) and a second part of the digital signature (X2) at the first party, wherein the first part of the digital signature and the second part of the digital signature are computed based on the first random number, the third random number, the session key (r), and the message digest (M);

compute a first ciphertext (C1), a first zero-knowledge proof (ZKP_C1) of the first ciphertext, a second ciphertext (C2), and a second zero-knowledge proof (ZKP_C2) of the second ciphertext, at the first party, wherein the first ciphertext is generated based on a Paillier Encryption technique using the first part of the digital signature (X1) and the Paillier public key and the second ciphertext is generated based on the Paillier Encryption technique using the second part of the digital signature (X2) and the Paillier public key;

share the first ciphertext (C1), the first zero-knowledge proof (ZKP_C1), the second ciphertext (C2) and the second zero-knowledge proof (ZKP_C1) with the second party for a zero-knowledge proof verification;

generate a third part of the digital signature (X3) and a fourth part of the digital signature (X4) upon successful validation of (a) the first zero-knowledge proof (ZKP_C1), and (b) the second zero-knowledge proof (ZKP_C1), wherein the third part of the digital signature and the fourth part of the digital signature are generated using the second random number, the fourth random number, the session key (r), the message digest (M) and the private key share of the second party (b);

compute a third ciphertext (C3) of the third signature and a fourth ciphertext (C4) of the fourth signature at the second party, wherein the third ciphertext and the fourth ciphertext (C4) are generated using the Paillier Encryption technique;

generate an encrypted form of a full signature (Z) at the second party and sharing the encrypted form of the full signature (Z) with the first party, wherein the encrypted form of the full signature (Z) is generated by a summation of the third ciphertext (C3) and the fourth ciphertext (C4) using the Paillier encryption parameter; and obtain the digital signature (S) at the first party, wherein the digital signature is obtained by decrypting the encrypted form of full signature using the Paillier private key based on the Paillier Encryption technique and a ECDSA signature verification technique.

* * * * *